Jan. 17, 1933.  G. R. CRUZE  1,894,552
FASTENING DEVICE FOR AUTO LICENSE TAGS OR THE LIKE
Filed May 12, 1932  2 Sheets-Sheet 1
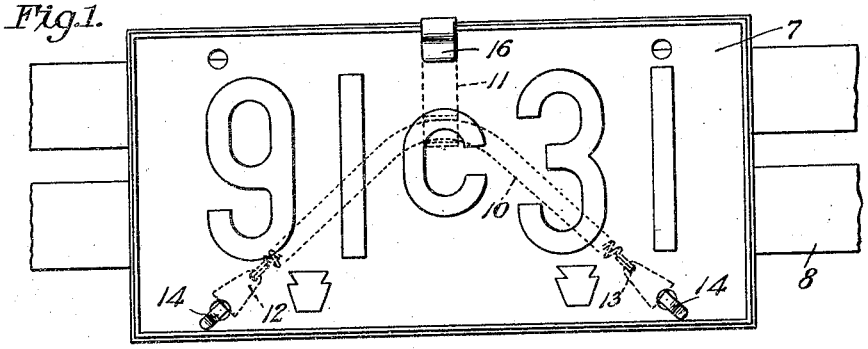
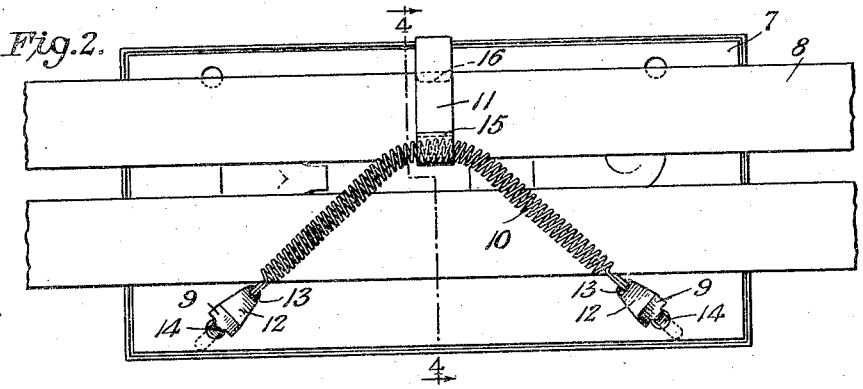
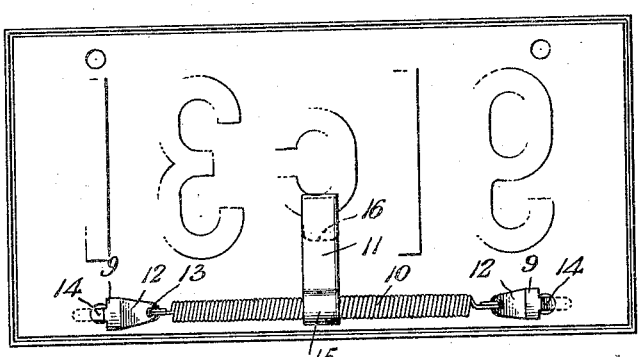
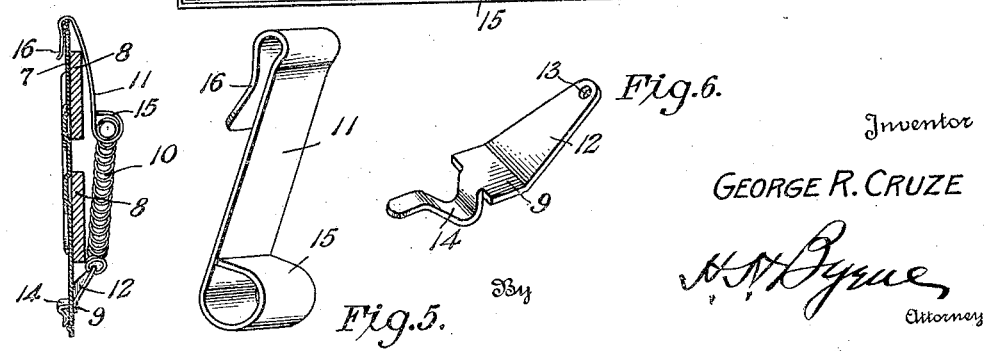
Inventor
GEORGE R. CRUZE
By H. N. Byrne
Attorney Jan. 17, 1933.  G. R. CRUZE  1,894,552
FASTENING DEVICE FOR AUTO LICENSE TAGS OR THE LIKE
Filed May 12, 1932   2 Sheets-Sheet 2

Inventor
GEORGE R. CRUZE
By
Attorney

Patented Jan. 17, 1933

1,894,552

UNITED STATES PATENT OFFICE

GEORGE R. CRUZE, OF DANVILLE, PENNSYLVANIA

FASTENING DEVICE FOR AUTO LICENSE TAGS OR THE LIKE

Application filed May 12, 1932. Serial No. 610,958.

The present invention relates to fastening devices for automobile license tags or the like and consists in the combinations and arrangements of elements hereinafter described and particularly set forth in the accompanying claims.

The invention has for its purpose to provide a novel form of fastening device of this character which may be readily and quickly applied to or removed from position without the employment of tools, which will accurately and firmly hold the license tag in position, and one that may be employed without any alterations whatsoever on either the tag or the car accessory.

The invention further contemplates providing a device of this character that may be continuously used on tags through succeeding seasons, and which may be manufactured and sold in quantities at small cost thereby giving a substantial margin of profit to the merchant or salesman.

The device may be used with equal facility on the front or rear of the car and is designed to fit the bumper bar, light bar, the present license plate holder or in fact any miscellaneous part of the car. It is of utmost simplicity in construction, has the desired qualities of rigidity and flexibility, and is adapted for any size license plate and not subject to appreciable rusting.

The article as shown herein is proposed as a further utilization of that disclosure in my co-pending application for U. S. Letters Patent, "fastening device for sheet metal structures", Serial No. 590,721, filed February 3, 1932.

The invention is shown by way of illustration in the accompanying drawings, wherein:

Figure 1 is a front view of the device fitted to the bumper bar of a car.

Figure 2 a rear elevational view of the same.

Figure 3 shows the device on the license plate removed.

Figure 4 a transverse sectional view of Figure 2 on the line 4—4 thereof.

Figure 5 a detailed perspective view of the hook member.

Figure 6 a detailed perspective view of the preferred form of fastener.

Figure 7:
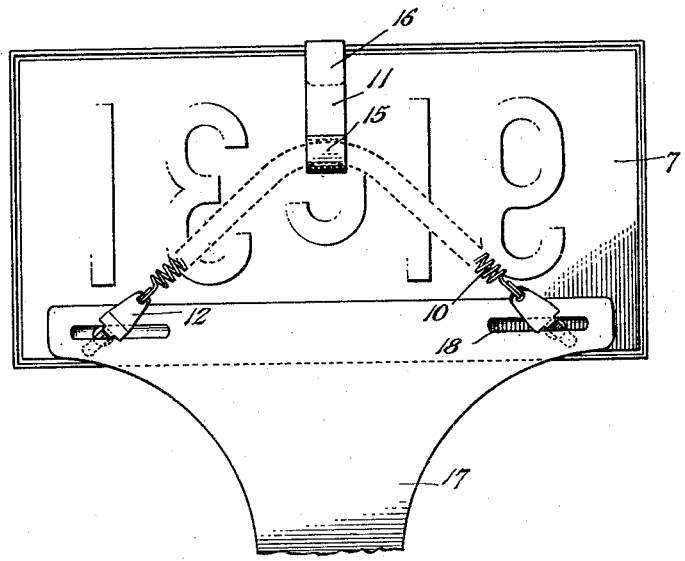
Figure 7 shows the application of the device to the usual license plate holder of a car.

Referring to the construction in further detail and wherein like reference characters designate corresponding parts in the different Figures shown 7 represents the ordinary license plate of an automobile, and 8 the usual type of bumper bar thereof, at the front or rear of the car, and to which the plate securing means is adapted to be fitted and securely held after the manner described herein.

The fastening device per se consists of two similar members or resilient clips 9 held in tension by the spring 10 and hook member 11 engaged respectively with the apertures adjacent the lower corners of the plate 7 and at the medial upper edge portion thereof. Each of said clips has an enlarged and angular shank portion 12 apertured as at 13 to connect with the terminal ends of the spring 10. And said angular portions 12, acting under the tension of said spring, exert a wedging or clamping action against the engaging portions 14 of said clips thereby causing the same to bind tightly against the surface of the license tag 7 after the manner indicated in Figure 4. The hook member 11 has a loop portion 15 through the medium of which it is connected to the central portion of the spring 10, and said member has a hook portion 16 through the medium of which it is adapted to be connected to the upper edge of the license plate 7.

In applied position the device is preferably fitted to the license tag as shown in Figures 1 and 2 wherein the terminal portions 14 of the clips freely pass through apertures in the tag, and the hook portion 16 fits over the upper medial edge thereof. In this relation the tension spring 10 firmly holds together the clips 9 and the hook member 11 causing the ends of clips 14 to bind against the surface of the tag and effect the desired clamping action for holding the device rigid and in applied position.

In the arrangement shown in Figures 1 and 2 it will be noted the device is applied to the tag and bumper bar at three (3) points, i. e. adjacent the two (2) lower corners and at the medial top edge. It is contemplated, however, that the device may also be used without the hook member 11, i. e. by the two clip members 9 alone under the tension of spring 10. This application of the device is illustrated in Figure 3, and when so employed it is necessary only that the spring be fitted over any convenient or accessible part of the car.

In the construction shown in Figure 7 the tag is shown mounted on the usual license plate support 17. Thus in this instance the two clips engage within the slotted portions 18 of the tag support 17 and the usual apertures of the tag, and the hook member 11 engages the tag only and holds said spring 10 under the required tension.

Figure 8:
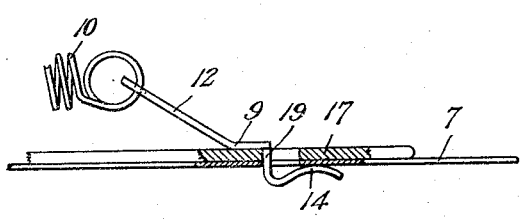
Figures 8 and 9 are detailed views, partly in section, showing different forms of the fastening device.
Figure 9:
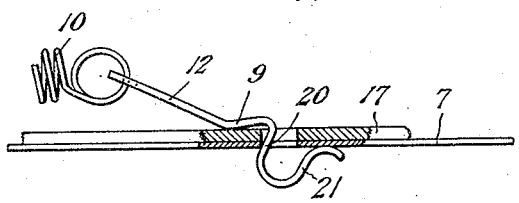

In the construction shown in Figure 8 the clip member 9 has its shank portion 19 bent substantially at right angles thereto and the terminal portion 14 is slightly curved as shown. With this arrangement the tension of spring 10 on the angular shank portions (9 and 19) causes the curved terminal 14 of the clip to bind tightly against the tag 7 and clamp the same to the supporting device 17. In the construction shown in Figure 9 the clip is substantially the same as that in Figure 8 except that in this instance the clip portion 20 is disposed at right angles to the shank portion 12. The curved terminal part 21 functions similar to the corresponding part 14 of the clip in Figure 8.

Figure 11:
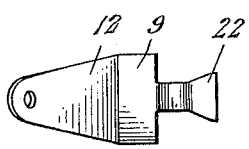
Figures 10, 11 and 12 are top plan views of other forms of fastener.
Figure 10:
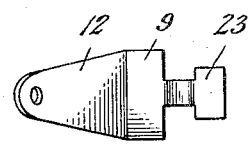
Figure 12:
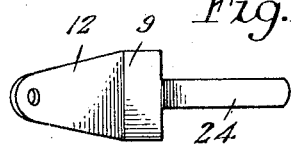

In the constructions shown in Figures 10, 11 and 12, the clip terminal portions are modified to meet possible conditions in designs of tags, the apertures therein, and likewise the different tag supports on cars. Thus, in Figure 10 the terminal portion 23 is appreciably widened laterally, and for insertion is turned at a right angle. In Figure 11 the terminal 22 is of dovetail design and in Figure 12 is elongated or extended.

It is to be understood the invention is not limited to the precise details of construction and arrangement herein disclosed, as it is obvious various modifications may be made therein without departing from the essential features of the invention.

What is claimed as new is:

1. A device for holding auto license tags comprising a pair of hook members adapted to engage distal apertures in the tag adjacent the lower corners thereof, a third hook member for fitting over the upper medial portion of the tag, and a tensioning spring connecting said three hook members, as and for the purpose set forth.

2. A device for holding an auto license tag, comprising a pair of hook members adapted to engage the front and rear faces of portions of the tag distantly related and located below the upper edge of the tag, a tensioning spring connected at its ends to the hook members, and a third hook member connected to the spring between the ends of the latter and adapted to engage over the upper medial edge of the tag.

3. A device for holding an auto license tag having distal openings near the lower edge thereof, comprising hook members each having an angular portion and an engaging portion, said angular portions being adapted to contact with and extend from one side of the tag and said engaging portions being adapted to pass through said openings and overlie the opposite side of the tag, and a spring terminally connected to said angular portions and exerting tension thereon to constantly urge said engaging portions in the direction of said opposite side of the tag.

4. A device for holding an auto license tag having distal openings near the lower edge thereof, comprising hook members each having an angular portion and an engaging portion, said angular portions being adapted to contact with and extend from one side of the tag and said engaging portions being adapted to pass through said openings and overlie the opposite side of the tag, a spring terminally connected to said angular portions and exerting tension thereon to constantly urge said engaging portions in the direction of said opposite side of the tag, and a third hook member engaging the spring between the ends of the latter and adapted to be fitted over the upper medial portion of the tag.

In testimony whereof, I affix my signature.

GEORGE R. CRUZE.